United States Patent [19]

Heidemann

[11] Patent Number: 5,170,447
[45] Date of Patent: Dec. 8, 1992

[54] OPTICAL COMMUNICATION SYSTEM WITH A FIBER-OPTIC AMPLIFIER

[75] Inventor: Rolf Heidemann, Tamm, Fed. Rep. of Germany

[73] Assignee: Alcatel N.V., Amsterdam, Netherlands

[21] Appl. No.: 675,093

[22] Filed: Mar. 25, 1991

[30] Foreign Application Priority Data

Apr. 3, 1990 [DE] Fed. Rep. of Germany ....... 4010712

[51] Int. Cl.[5] .............................................. G02B 6/26
[52] U.S. Cl. ...................................... 385/24; 385/27; 372/6
[58] Field of Search ............... 350/96.14, 96.15, 96.16; 385/5, 27, 30, 42, 24; 372/6

[56] References Cited

U.S. PATENT DOCUMENTS

| | | | |
|---|---|---|---|
| 4,515,431 | 5/1985 | Shaw et al. | 385/30 |
| 4,546,476 | 10/1985 | Shaw et al. | 385/42 X |
| 4,553,238 | 11/1985 | Shaw et al. | 385/42 X |
| 4,554,510 | 11/1985 | Shaw et al. | 372/6 X |
| 4,674,830 | 6/1987 | Shaw et al. | 385/30 X |
| 4,680,809 | 7/1987 | Hartkopf et al. | 350/96.16 |
| 4,708,421 | 11/1987 | Desurvire et al. | 385/30 |
| 4,723,824 | 2/1988 | Shaw et al. | 385/39 X |
| 4,738,503 | 4/1988 | Desurvire et al. | 385/30 |
| 4,786,140 | 11/1988 | Melman et al. | 350/96.15 X |
| 4,815,804 | 3/1989 | Desurvire et al. | 385/27 |
| 4,859,016 | 8/1989 | Shaw et al. | 385/5 |
| 4,973,169 | 11/1990 | Slonecker | 350/96.16 |

OTHER PUBLICATIONS

"5 GBIT/S Transmission Over 146 KM Using Erbium-Doped Fibre Amplifier", Berthold Wedding, Thomas Pfeiffer, and Manfred Wittmann, *ECOC 1989 15th European Conference on Optical Communications*, Sep. 10–14, 1989, pp. 86089.

*Primary Examiner*—John D. Lee
*Assistant Examiner*—Phan T. Heartney
*Attorney, Agent, or Firm*—Ware, Fressola, Van Der Sluys & Adolphson

[57] ABSTRACT

In an optical communication system with a fiber-optic amplifier (10) which includes a wavelength-selective fiber-optic coupler (12) for coupling pump light into the amplifying length of fiber (11), according to the invention, an additional optical signal from, e.g., a service channel is transmitted from the location of the fiber-optic amplifier (10) in one direction or the other by being coupled into the unused port (4) of the wavelength-selective fiber-optic coupler (12). Any coupler (12) suitable for coupling the pump light into the amplifying length of fiber (11) can thus be used to couple an additional optical signal into the fiber-optic link (15) of the system without any special step having to be taken.

11 Claims, 2 Drawing Sheets

OPTICAL COMMUNICATION SYSTEM WITH A FIBER-OPTIC AMPLIFIER

BACKGROUND OF THE INVENTION

1. Field of the Invention

The present invention relates to a system for transmitting an optical signal over an optical waveguide containing a fiber-optic amplifier.

2. Description of the Prior Art

A system for transmitting a first optical signal over an optical waveguide containing a fiber-optic amplifier which includes an amplifying length of fiber, a pump source, and a wavelength-selective fiber-optic coupler for coupling the pump source to the amplifying length of fiber is known from "EOCC '89", Fifteenth European Conference on Optical Communication, Sept. 10–14, 1989, Gothenburg, Sweden, Proceedings, Vol. 1, Regular Papers, TuA 5–7, pages 86 to 89.

In the above-referenced article, two different system configurations are explained. In the first ("co-propagating configuration"), the light from the pump source is launched into the $Er^{3+}$-doped length of fiber via a coupler which is located in front of the amplifying length of fiber when viewed in the direction of transmission of the optical signal to be amplified. In the second system configuration ("counter-propagating configuration"), the coupler is located behind the length of fiber when viewed in the direction of transmission of the signal to be amplified. Sometimes it is desirable or necessary in transmission systems to transmit, in addition to the first optical signal, a second optical signal from the location of the fiber-optic amplifier in one direction or the other.

SUMMARY OF THE INVENTION

It is an object of the invention to provide a system suitable for the above purposes.

This object is attained by coupling an optical transmitter to an unused port of the fiber-optic coupler to provide a second optical signal to the unused port, whereby the second optical signal is provided to the optical waveguide.

DETAILED DESCRIPTION OF THE DRAWINGS

Figure 1:
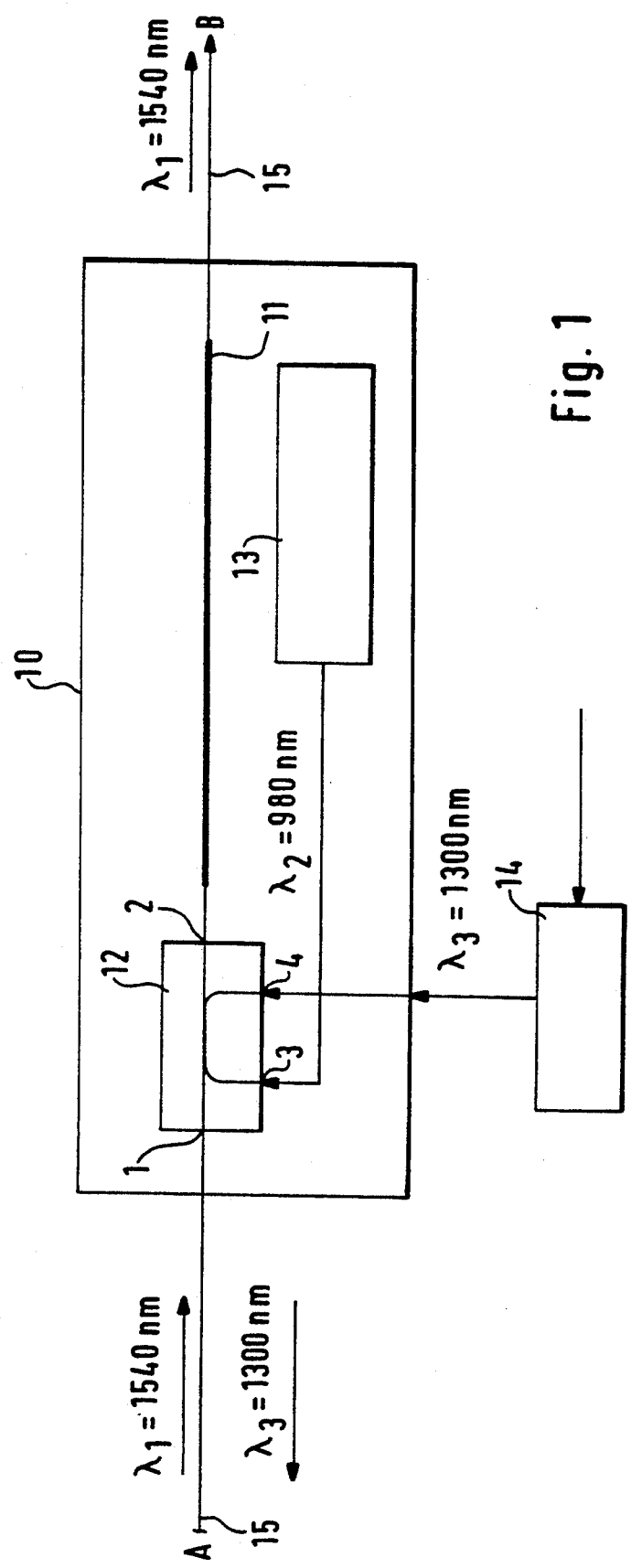
Figure 2:
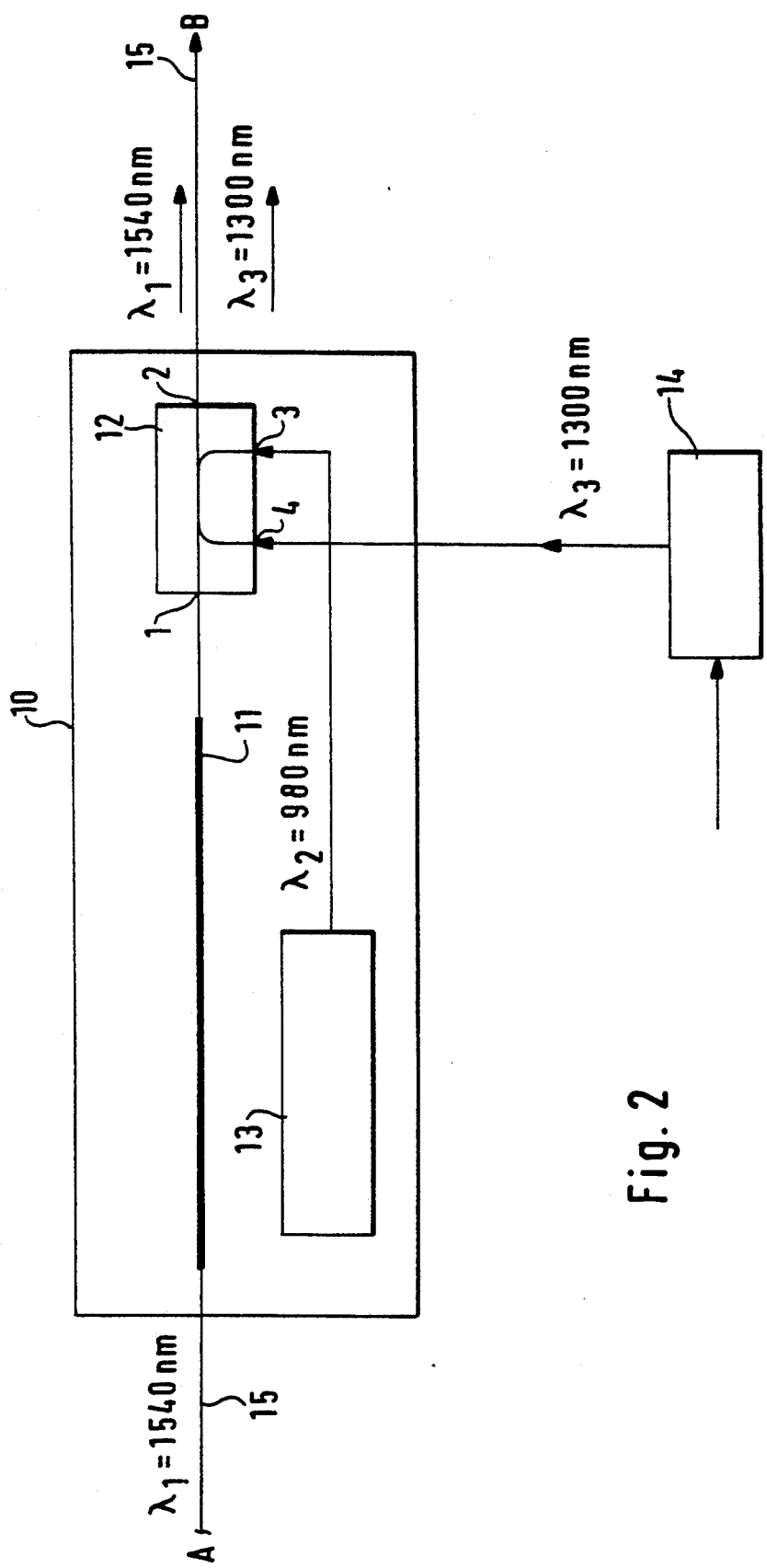

FIG. 1 shows an embodiment for transmitting the second optical signal in a direction opposite to that of the first optical signal, and FIG. 2 shows an embodiment for transmitting the second optical signal in the same direction as the first optical signal.

DETAIL DESCRIPTION OF THE INVENTION

FIG. 1 shows a transmission system for transmitting an optical signal from a point A to a point B. At the end point A there is an optical transmitter (not shown), and at the end point (B) there is an optical receiver (not shown). The optical signal to be transmitted from A to B has a wavelength $\lambda_1$ to 1540 nm. The transmission link is implemented with a single-mode optical waveguide 15 which has sufficiently good transmission properties at the wavelength $\lambda_1$. The system of FIG. 1, like the prior art system referred to above, includes a fiber-optic amplifier 10 consisting of an $Er^{3+}$-doped length of fiber 11, a wavelength-selective fiber-optic coupler 12, and a pump source 13. The coupler 12 has four ports 1 to 4. Port 1 is connected to the optical waveguide 15 coming from the end point A, port 2 is connected to the $Er^{3+}$-doped length of fiber 11, and port 3 is connected via an optical waveguide to the pump source 13. The coupler 12 is a wavelength-selective coupler which has the property of coupling the optical signal of wavelength $\lambda_1$, which is to be transmitted from A to B, from port 1 to port 2 with minimum loss, and of coupling the pump light generated by the pump source 13, which has a wavelength $\lambda_2$ of 980 nm, from port 3 to port 2 with minimum loss. Thus, not only the optical signal to be amplified but also the pump light necessary for amplification is fed into the $Er^{3+}$-doped length of fiber 11.

According to the invention, the additional coupler port 4 is used to transmit a second optical signal from the location of the fiber-optic amplifier in the direction of the end point A of the transmission process. The electric signals to be transmitted in this direction, such as signals from service or backward channels, are converted by an optical transmitter 14 to an optical signal having a wavelength $\lambda_3$ of 1300 nm, which is transmitted from the optical transmitter 14 through an optical waveguide to coupler port 4.

The coupler 12, which is optimized for the above-described coupling of the pump light, has the property of performing the additional function—without the need for special steps—to couple the optical signal from port 4 with low loss to port 1, whence it is transmitted over the optical waveguide 15 in the direction of the end point A of the system.

In the system according to the invention shown in FIG. 2, parts having the same functions as in FIG. 1 are designated by similar reference characters and, therefore, need no separate explanation. The coupler 12 is located behind the $Er^{3+}$-doped length of fiber 11 when viewed in the direction of transmission of the signal to be transmitted from A to B. As in FIG. 1, it couples the signal from port 1 to port 2 and the pump light from port 3 into the length of fiber 11, the latter view port 1 instead of port 2 as in FIG. 1. In this configuration, an optical transmitter 14 having a wavelength $\lambda_3$ of 1300 nm is connected via an optical waveguide to coupler port 4, so that a second optical signal can be transmitted from the location of the fiber-optic amplifier 10 in the direction of the end point B of the transmission system. The second optical system of wavelength $\lambda_3$ travels in the same direction as the first optical signal of wavelength $\lambda_1$; in the system of FIG. 1, it travels in the opposite direction.

Instead of only one coupler in front of or behind the $Er^{3+}$-doped length of fiber 11, couplers may be provided on both sides as in the case of the above-mentioned prior art system, so that it is possible to transmit an additional signal from the location of the fiber-optic amplifier in one direction or the other (FIG. 1) or a first additional signal in one direction and a second additional signal in the other (FIG. 2).

It is also possible to supply the $Er^{3+}$-doped length of fiber 11 with pump light from both sides, i.e., from two pump sources each located on one side of the length of fiber.

The wavelengths specified in the embodiments described are only examples of wavelengths for which the available system components are suitable. It is possible, of course, to use other wavelengths provided that the system components are suitable for them.

I claim:

1. System for transmitting a first optical signal over an optical waveguide (15) comprising a fiber-optic amplifier (10) which includes an amplifying length of fiber (11), a pump source (13), and a wavelength-selective fiber-optic coupler (12) for coupling the pump source (13) to the amplifying length of fiber (11), characterized in that, in order to transmit a second optical signal, an optical transmitter (14) is coupled to an unused port (4) of the fiber-optic coupler (12).

2. A system as claimed in claim 1 wherein the fiber-optic coupler (12), as viewed in the direction of transmission of the first optical signal, is located in front of the amplifying length of fiber (11), characterized in that the fiber-optic coupler (12) couples the second optical signal into the optical waveguide (15) in such a way that it is transmitted in a direction opposite to that of the first optical signal (1).

3. A system as claimed in claim 2, characterized in that the first optical signal, the second optical signal, and the pump light have different wavelengths. ($\lambda_1$, $\lambda_3$, $\lambda_2$), and that the fiber-optic coupler (12) is wavelength-selective in such a way that is couples the first optical signal ($\lambda_1$) from a first port (1) to a second port (2), the pump light ($\lambda_2$) from a third port (3) to the second port (2), and the third optical signal ($\lambda_3$) from a fourth port (4) to the first port (1).

4. A system as claimed in claim 2, characterized in that the first optical signal, the second optical signal, and the pump light have different wavelengths ($\lambda_1$, $\lambda_3$, $\lambda_2$), and that the fiber-optic coupler (12) is wavelength-selective in such a way that it couples the first optical signal ($\lambda_1$) from a first port (1) to a second port (2), the pump light from a third port (3) to the first port (1), and the third optical signal ($\lambda_3$) from a fourth port (4) to the second port (2).

5. A system as claimed in claim 2, additionally comprising a second wavelength-selective fiber-optic coupler having an optical transmitter coupled to an unused port to provide a third optical signal thereto, the second fiber-optic coupler as viewed in the direction of transmission of the first optical signal, is located behind the amplifying length of fiber and is connected in the optical waveguide so that the second fiber-optic coupler couples the third optical signal into the optical waveguide in such a way that it is transmitted in the same direction as the first optical signal.

6. A system as claimed in claim 1 wherein the fiber-optic coupler (12), as viewed in the direction of transmission of the first optical signal, is located behind the amplifying length of fiber (11), characterized in that the fiber-optic coupler (12) couples the second optical signal into the optical waveguide (15) in such a way that it is transmitted in the same direction as the first optical signal.

7. A system as claimed in claim 6, characterized in that the first optical signal, the second optical signal, and the pump light have different wavelengths. ($\lambda_1$, $\lambda_3$, $\lambda_2$), and that the fiber-optic coupler (12) is wavelength-selective in such a way that it couples the first optical signal ($\lambda_1$) from a first port (1) to a second port (2), the pump light ($\lambda_2$) from a third port (3) to the second port (2), and the third optical signal ($\lambda_3$) from a fourth port (4) to the first port (1).

8. A system as claimed in claim 6, characterized in that the first optical signal, the second optical signal, and the pump light have different wavelengths ($\lambda_1$, $\lambda_3$, $\lambda_2$), and that the fiber-optic coupler (12) is wavelength-selective in such a way that it couples the first optical signal ($\lambda_1$) from a first port (1) to a second port (2), the pump light from a third port (3) to the first port (1), and the third optical signal ($\lambda_3$) from a fourth port (4) to the second port (2).

9. A system as claimed in claim 6, additionally comprising a second fiber-optic coupler and an optical transmitter connected to an unused port of said coupler for providing a third optical signal thereto, said second fiber-optic coupler as viewed in the direction of transmission of the first optical signal is located in front of the amplifying length of fiber so that the second fiber optic coupler couples the third optical signal into the optical waveguide in such a way that it is transmitted in a direction opposite to that of the first optical signal.

10. A system as claimed in claim 1, characterized in that the first optical signal, the second optical signal, and the pump light have different wavelengths, ($\lambda_1$, $\lambda_3$, $\lambda_2$), and that the fiber-optic coupler (12) is wavelength-selective in such a way that it couples the first optical signal ($\lambda_1$) from a first port (1) to a second port (2), the pump light ($\lambda_2$) from a third port (3) to the second port (2), and the third optical signal ($\lambda_3$) from a fourth port (4) to the first port (1).

11. A system as claimed in claim 1, characterized in that the first optical signal, the second optical signal, and the pump light have different wavelengths, ($\lambda_1$, $\lambda_3$, $\lambda_2$), and that the fiber-optic coupler (12) is wavelength-selective in such a way that it couples the first optical signal ($\lambda_1$) from a first port (1) to a second port (2), the pump light from a third port (3) to the first port (1), and the third optical signal ($\lambda_3$) from a fourth port (4) to the second port (2).

* * * * *

UNITED STATES PATENT AND TRADEMARK OFFICE
CERTIFICATE OF CORRECTION

PATENT NO. : 5,170,447
DATED : December 8, 1992
INVENTOR(S) : Rolf Heidemann It is certified that error appears in the above-identified patent and that said Letters Patent is hereby corrected as shown below:

Column 3, line 20, delete "is" and insert --it--.

Column 4, line 34, delete a comma "," after the word "wavelengths".

Column 4, line 43, delete a comma "," after the word "wavelengths".

Signed and Sealed this

Twenty-second Day of November, 1994

*Attest:*

BRUCE LEHMAN

*Attesting Officer*    *Commissioner of Patents and Trademarks*